United States Patent [19]

Page, Jr.

[11] 4,300,709
[45] Nov. 17, 1981

[54] AUTOMOBILE CONSOLE

[75] Inventor: Cornelius D. Page, Jr., Gastonia, N.C.

[73] Assignee: Allied Plastics, Inc., Gastonia, N.C.

[21] Appl. No.: 150,321

[22] Filed: May 16, 1980

[51] Int. Cl.³ ............................................. B60R 7/00
[52] U.S. Cl. ................................. 224/275; 224/42.42
[58] Field of Search .................... 224/275, 42.42 R; 211/74, 86; 297/188, 199; 220/1 A, 22, 334; D3/30

[56] References Cited

U.S. PATENT DOCUMENTS

| D. 208,217 | 8/1967 | Castion | D58/13 |
| D. 232,871 | 9/1974 | George, et al. | D87/1 |
| D. 248,294 | 6/1978 | McCutchen | D12/16 |
| 2,640,595 | 6/1953 | Byford | 224/275 X |
| 2,726,710 | 12/1955 | Cutler | 297/194 |
| 2,897,974 | 8/1959 | Cook | 224/42.42 R |
| 3,118,704 | 1/1964 | Meserve | 224/275 X |
| 3,223,281 | 12/1965 | Larkin | 221/46 |
| 3,338,629 | 8/1967 | Drees | 224/275 X |
| 3,409,193 | 11/1968 | Metcalf | 224/42.42 R X |
| 3,561,589 | 2/1971 | Larkin, Jr. et al. | 206/19.5 R |
| 3,804,233 | 4/1974 | Gregg, Jr. | 206/19.5 R |

Primary Examiner—Steven M. Pollard
Attorney, Agent, or Firm—Bell, Seltzer, Park & Gibson

[57] ABSTRACT

An automobile console is provided which is adapted to hold various articles in an organized fashion adjacent the driver or passenger, and which is able to be positioned either on the automobile hump, or retained on the seat. The console includes a hinged lid for selectively covering either one of two article receiving receptacles, and which further serves as an armrest or writing support when the console is positioned on a seat. The console also includes an elongate flat extension which is pivotally connected to the bottom wall of the console, and which is adapted to extend outwardly from the console and be positioned between the seat cushions of the automobile to securely hold the console on the seat.

12 Claims, 9 Drawing Figures

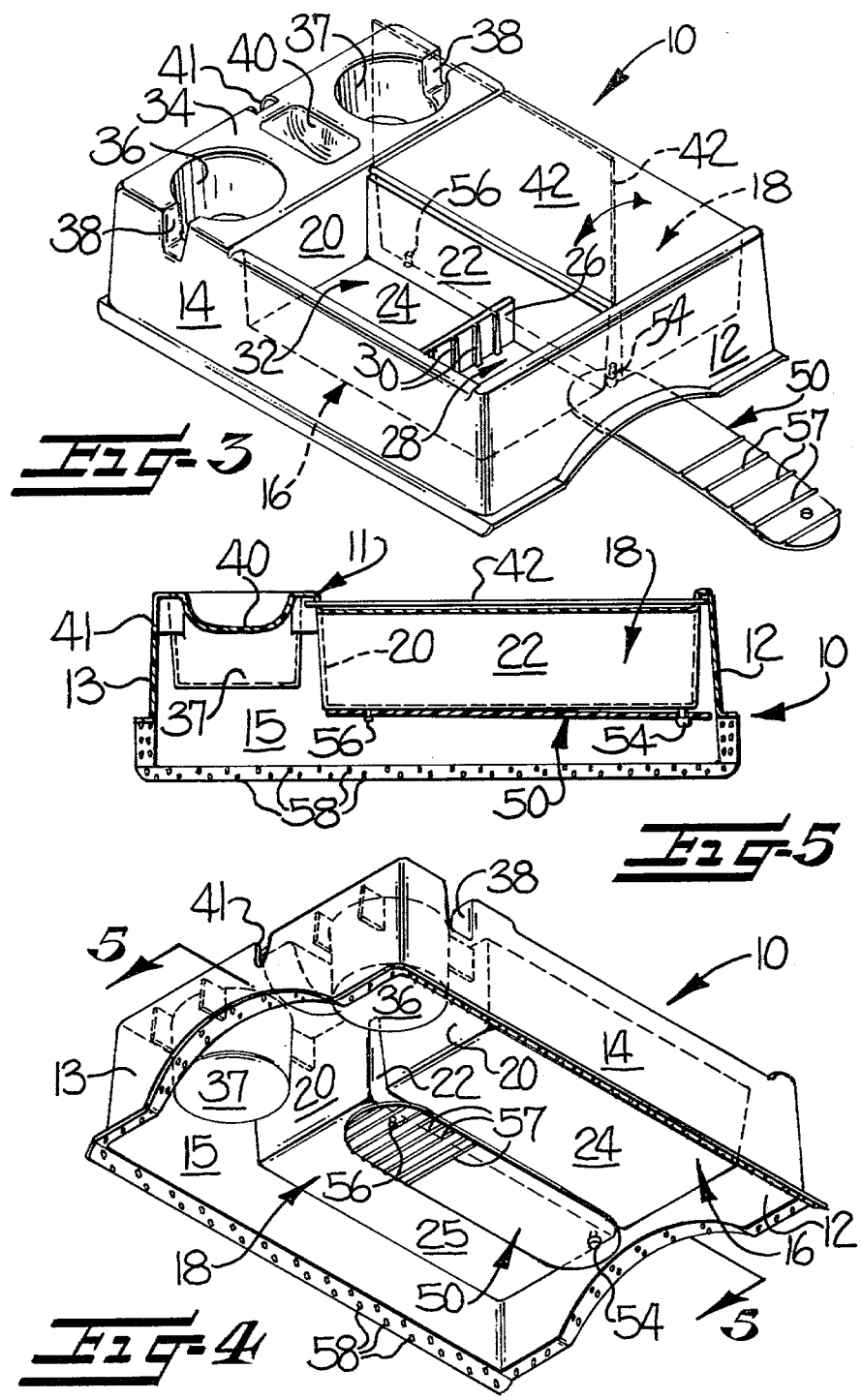

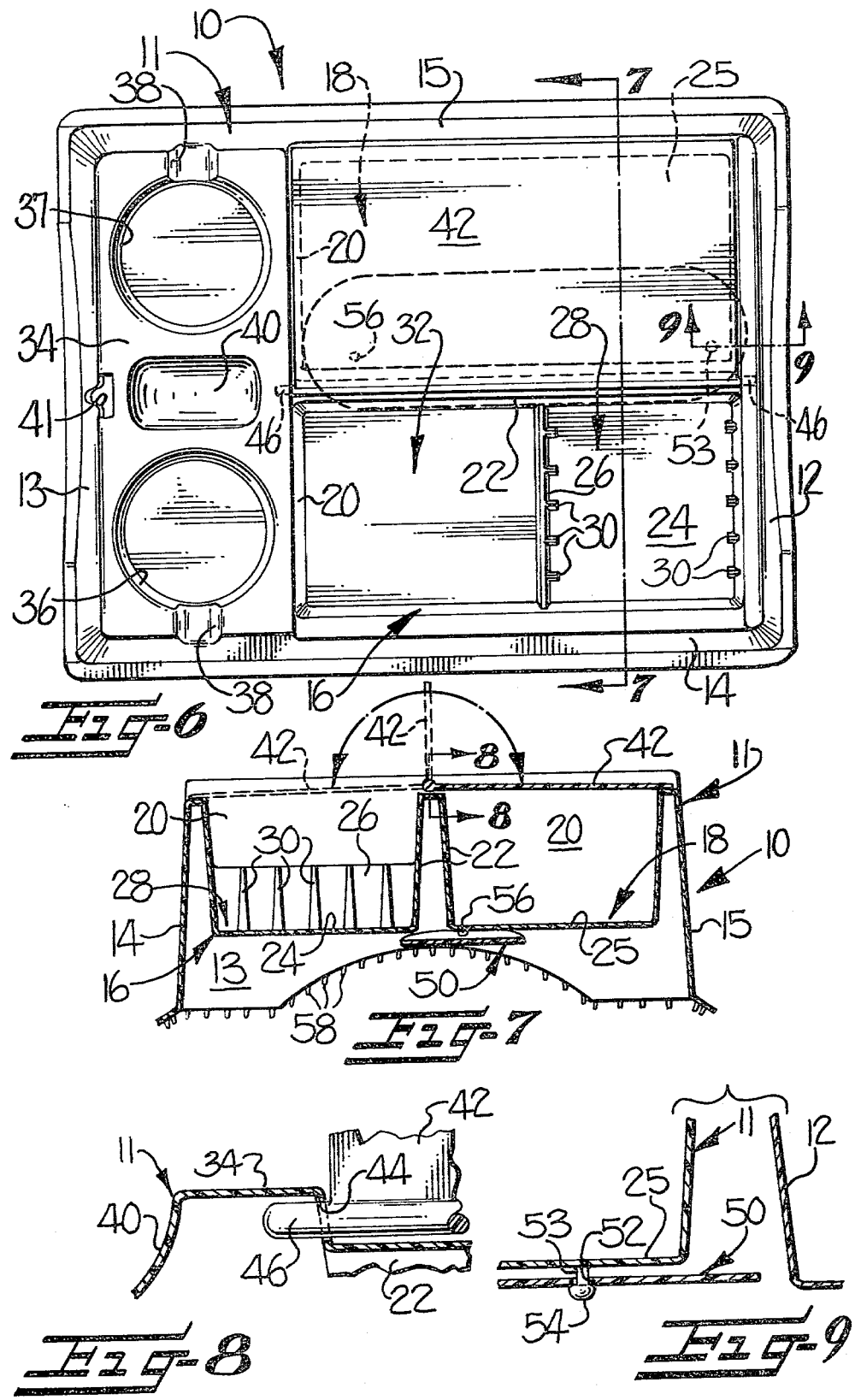

AUTOMOBILE CONSOLE

The present invention relates to a molded plastic console adapted for use in an automobile to retain various articles at a convenient location adjacent the driver or passenger.

Automobile consoles of various designs have heretofore been marketed which are intended to rest upon the automobile hump and support various articles at a location adjacent the driver. While these prior consoles have in some cases been commercially successful, their utility has been limited by the fact that they are designed and shaped in such a way that they can only be positioned on the hump. They cannot as a practical matter be positioned on the seat, since they would tend to slide from the seat during movement of the automobile, and thus their utility is limited to holding articles at a location on the hump.

It is accordingly an object of the present invention to provide an automobile console of the described type which has significantly increased utility.

It is another object of the present invention to provide an automobile console having the ability to be either placed on the automobile hump, or securely positioned on an automobile seat.

It is a more particular object of the present invention to provide an automobile console which is characterized by the ability to retain various articles at a convenient location on the seat adjacent the driver or passenger, and which also has the ability to function as an armrest or writing support while positioned upon the automobile seat.

These and other objects and advantages of the present invention are achieved in the embodiment illustrated herein by the provision of a molded plastic console which comprises a support skirt having a rectangular outline in plan view and which is composed of a pair of opposing parallel end walls and a pair of opposing parallel side walls. The body further includes interior wall means which divide at least a substantial portion of the area within the end and side walls into two side-by-side receptacles of like rectangular outline. A planar lid is provided which has a rectangular outline generally conforming to that of each of the receptacles, and the lid is mounted for pivotal movement about an axis disposed immediately above and aligned between the two receptacles. By this arrangement, the lid may be selectively pivoted to cover either one of the receptacles and is adapted to function as an armrest or writing support in either position.

The console further comprises an elongate flat extension having a length equal to at least about one half the distance between the end walls, and means pivotally mounting the extension to the bottom wall of the receptacles and adjacent one of the end walls. The extension may thereby be pivoted to a non-operative position disposed entirely beneath the console and wherein the console is adapted to be mounted on the hump, or to a seat retaining position wherein the extension projects a substantial distance beyond the adjacent end wall and wherein the console is adapted to be retained on the seat of the auto.

Some of the objects of the invention having been stated, others will become evident as the description proceeds, when taken in connection with the accompanying drawings, in which:

FIG. 3 is a perspective view of the console and with the extension pivoted to its operative position;

FIG. 4 is a perspective view of the bottom side of the console, and with the extension pivoted to its non-operative position;

FIG. 5 is a sectional elevation view taken substantially along the line 5—5 of FIG. 4;

FIG. 6 is a top plan view of the console;

FIG. 7 is a sectional end view taken substantially along the line 7—7 of FIG. 6;

FIG. 8 is an enlarged fragmentary sectional view taken substantially along the line 8—8 of FIG. 7; and FIG. 9 is an enlarged fragmentary sectional view taken substantially along the line 9—9 of FIG. 6.

Figure 1:
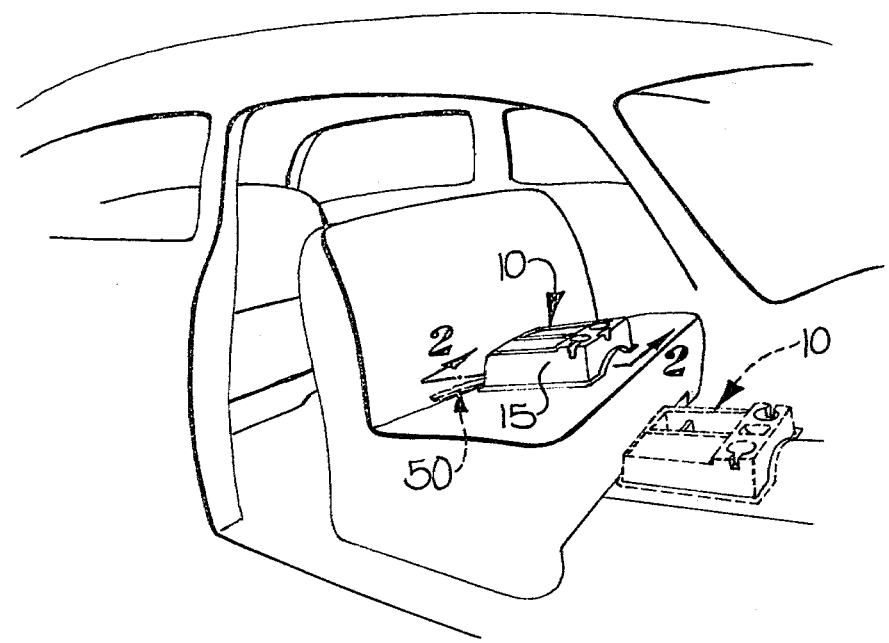
FIG. 1 is a perspective view illustrating the console of the present invention secured upon an automobile seat, and further showing in dashed lines the console mounted upon the automobile hump.

Referring more specifically to the drawings, an automobile console embodying the features of the present invention is illustrated generally at 10. The console is preferably composed of an integral molded plastic body 11, which includes a support skirt having a rectangular outline in plan view and which is composed of a pair of opposing parallel end walls 12, 13, and a pair of opposing parallel side walls 14, 15. The upper edges of the end and side walls as seen in FIG. 3 define the top side of the console, and the lower edges of these walls define the bottom side of the console.

The plastic body 11 of the console further comprises interior wall means dividing at least a substantial portion of the area within the end and side walls into two side-by-side receptacles 16, 18 of like rectangular outline. More particularly, the interior wall means comprises a medial wall 20 extending transversely between the side walls 14, 15 at a location intermediate the end walls 12, 13 and lying in a plane which is parallel to the end walls. Further, a divider wall 22 is provided which lies in a plane parallel to and equally spaced between the side walls 14, 15 and extends between the medial wall 20 and the end wall 12. As best seen in FIG. 5, the upper edge of the divider wall 22 is disposed at a level slightly below that of the medial wall 20 and end wall 12, for the purpose described below. A pair of generally planar bottom walls 24, 25 respectively close the bottom of the receptacles 16, 18.

The receptacle 16 includes a further wall 26 of reduced height and which extends between the side wall 14 and the divider wall 22. The wall 26 serves to divide the receptacle 16 into one compartment 28 which, in the illustrated embodiment, is sized to receive a number of conventional tape cassettes. A number of spaced apart ridges 30 are provided on each of the oppositely facing portions of the walls 12 and 26 (note FIG. 6), and so as to provide aligned trackways on the walls for slideably receiving and retaining the cassettes therebetween. The wall 26 also defines a second compartment 32 which is sized to receive a number of eight-track tape cartridges or other articles. The other receptacle 18 is free of any further walls, and is sized to receive a conventional box of facial tissue or the like.

In the illustrated embodiment, the medial wall 20 is offset from the middle of the console, and is disposed from the wall 12 a distance equal to about two thirds of the distance between the end walls 12 and 13. A top wall 34 covers that portion of the area within the support skirt between the medial wall 20 and the end wall 13, and the top wall 34 is contoured to define a pair of depending cylindrical recesses therein 36, 37 which are each sized to supportingly receive a drinking glass or cup. The cylindrical recesses 36, 37 are respectively disposed adjacent the opposite side walls 14, 15, and each side wall includes a notch 38 therein which communicates with the adjacent recess for receiving the handle of a coffee cup or the like therein. The top wall 34 is further contoured to define an arcuately curved depression 40 disposed between the recesses 36, 37 and which is adapted for receiving coins or the like therein. Also, a T-shaped slot 41 is formed at the juncture of the end wall 13 and top wall 34, which is adapted to supportingly receive the microphone M of a CB radio in the manner shown in FIG. 2.

The console 10 further includes a planar plastic lid 42 having a rectangular outline generally conforming to that of each of the receptacles 16, 18. The lid 42 is mounted to the console by hinge means which permit its pivotal movement about an axis disposed along the divider wall 22 and immediately adjacent the top side thereof. More particularly, and as best seen in FIGS. 6–8, the hinge means comprises a pair of aligned openings 44 respectively positioned in each of the medial wall 20 and the end wall 12 immediately above the adjacent edge of the divider wall. Further, the lid 42 includes a pair of axially aligned pins 46 fixed to and extending from respective corners thereof, and with the pins 46 being disposed within respective ones of the openings 44. By this arrangement, the lid 42 may be selectively pivoted to cover either of the receptacles 16, 18 and is adapted to function as an armrest or a writing support in either position. Further, the lid 42 may be readily removed from the console, by lifting the side edge thereof which extends between the pins, so as to curve the lid and thereby foreshorten the distance between the pins, resulting in the pins being withdrawn from the openings 44. The lid may be readily replaced in its assembled position by merely reversing this procedure.

Figure 2:
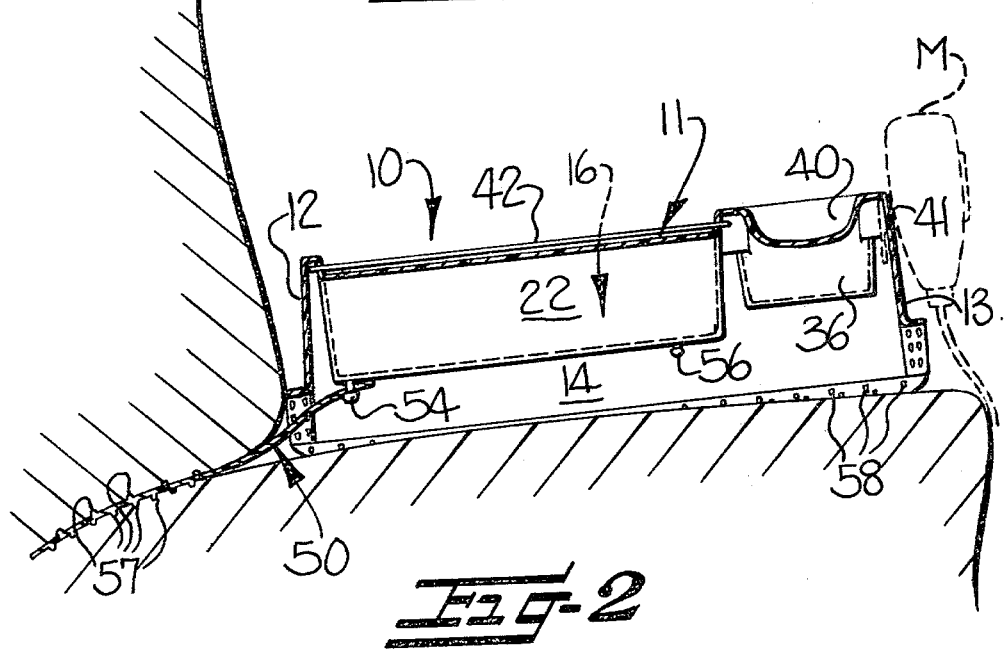
FIG. 2 is a sectional elevation view taken substantially along the line 2—2 of FIG. 1, and illustrating the manner in which the console is secured upon the seat.

The console 10 further includes an elongate, flat plastic extension 50 having a length equal to at least about one half the distance between the end walls 12 and 13. The extension 50 is mounted to the bottom wall 25 adjacent the end wall 12, by an arrangement which includes an aperture 52 (FIG. 9) in the extension adjacent one end thereof, and a vertical post 53 formed integrally on the underside of the bottom wall 25 and extending downwardly through the aperture 52. An enlargement 54 is formed at the end of the post for retaining the extension thereon. Thus the extension 50 may be pivoted about a vertical axis between a non-operative position disposed entirely beneath the console (note FIG. 4) and wherein the console is adapted to be mounted on the automobile hump in the manner shown in dashed lines in FIG. 1, or to a seat retaining position (note FIG. 3) and wherein the extension projects a substantial distance beyond the end wall 12 and the console is adapted to be retained on the seat of the automobile as shown in FIGS. 1 and 2, with the extension held between the cushions of the seat.

To releasably retain the extension in the above described non-operative position, the extension 50 is provided with a second aperture (not numbered) adjacent the other end, and a second post 56 (FIGS. 5–7) extends from the underside of the bottom wall 25, with the post 56 being located so as to removably receive the second aperture therethrough when the extension is disposed in the non-operative position. The extension further includes integrally formed ridges 57 on both of its faces, which serve to facilitate its retention between the cushions of the seat.

The bottom side of the end walls 12, 13 have an arcuate curvature along the medial portion of their length as best seen in FIGS. 3 and 4. This curvature is designed to conform to the curvature of the automobile hump, and thereby facilitates the placement of the console thereon. Further, the bottom side of the end walls 12, 13 and side walls 14, 15 include a plurality of pin-like projections 58 for engaging the carpet on the automobile hump to prevent the console from slipping thereon.

In the drawings and specification, there has been set forth a preferred embodiment of the invention, and although specific terms are employed, they are used in a generic and descriptive sense only and not for purposes of limitation.

That which is claimed is:

1. A molded plastic console adapted for use in an automobile to retain various articles at a convenient location adjacent the driver or passenger, and characterized by the ability to also function as an armrest or writing support while being retained upon the automobile seat, and comprising
   an integral molded plastic body comprising
   (a) a support skirt having a rectangular outline in plan view and composed of a pair of opposing parallel end walls and a pair of opposing parallel side walls, with said end and side walls defining a top side and a bottom side of the console, and
   (b) interior wall means dividing at least a substantial portion of the area within said end and side walls into two side-by-side receptacles of like rectangular outline,
   a planar lid having a rectangular outline generally conforming to that of each of said receptacles,
   hinge means mounting said lid for pivotal movement about an axis disposed immediately above and aligned between said receptacles, whereby said lid may be selectively pivoted to cover either of said receptacles and is adapted to function as an armrest or a writing support in either position,
   an elongate flat extension, and
   means mounting said extension to said body adjacent one of said end walls, and such that the extension projects a substantial distance beyond said one end wall and is adapted to be retained between the cushions of the seat.

2. The console as defined in claim 1 wherein said hinge means comprises a pair of axially aligned openings positioned in said body at respective ones of the adjacent corners of said receptacles, and a pair of axially aligned pins fixed to and extending from respective corners of said lid, and with said pins being disposed within respective ones of said openings.

3. The console as defined in either claim 1 or 2 wherein said means mounting said extension includes a pivotal connection between said body and extension, and whereby the extension may be pivoted to a non-operative position disposed entirely beneath the console.

4. A molded plastic console adapted for use in an automobile to retain various articles at a convenient location adjacent the driver or passenger, and characterized by the ability to also function as an armrest or writing support, and comprising a support skirt having a rectangular outline in plan view and composed of a pair of opposing parallel end walls and a pair of opposing parallel side walls, and with said end and side walls defining a top side and a bottom side of said console, a medial wall extending transversely between said side walls at a location intermediate said end walls and lying in a plane which is parallel to said end walls, a divider wall lying in a plane parallel to and equally spaced between said side walls and extending between said medial wall and one of said end walls, to thereby define two side-by-side receptacles of like rectangular outline occupying the area between said medial wall and said one end wall, a pair of generally planar bottom walls respectively closing the bottom of each of said receptacles, a planar lid having a rectangular outline generally conforming to that of each of said receptacles, and hinge means mounting said lid for pivotal movement about an axis disposed along said divider wall and immediately adjacent the top side thereof, whereby said lid may be selectively pivoted to cover either of said receptacles and is adapted to function as an armrest or a writing support in either position.

5. The console as defined in claim 4 wherein said medial wall is disposed further from said one end wall than the other end wall, and such that said receptacles collectively occupy a major portion of the area within said support skirt.

6. The console as defined in claim 5 wherein said medial wall is disposed from said one end wall a distance equal to about two thirds of the distance between said end walls.

7. The console as defined in claim 6 further comprising a top wall covering that portion of the area within said support skirt between said medial wall and said other end wall.

8. The console as defined in claim 7 wherein said top wall is contoured to define a pair of depending cylindrical recesses therein which are each sized to supportingly receive a drinking glass or cup.

9. The console as defined in claim 8 wherein said cylindrical recesses are respectively disposed adjacent the opposite side walls, and each side wall includes a notch therein which communicates with the adjacent recess for receiving the handle of a coffee cup or the like therein.

10. The console as defined in claim 9 wherein the top wall is further contoured to define an arcuately curved depression disposed between said recesses and adapted for receiving coins therein.

11. The console as defined in claim 10 further comprising an elongate flat extension, and means pivotally mounting said extension to one of said bottom walls adjacent said one end wall, and whereby the extension may be pivoted to a non-operative position disposed entirely beneath the console or to a seat retaining position wherein the extension projects a substantial distance beyond said one end wall.

12. The console as defined in claim 11 wherein the edge of said divider wall at the top side of the console is disposed slightly below the medial wall and one end wall, and wherein said hinge means comprises a pair of aligned openings respectively positioned in each of said medial wall and said one end wall immediately above such edge of said divider wall, and a pair of axially aligned pins fixed to and extending from respective corners of said lid, and with said pins disposed within respective ones of said openings.

* * * * *